United States Patent [19]

Zapart

[11] 4,151,984
[45] May 1, 1979

[54] SELECTIVELY POSITIONAL V-BLOCK FIXTURE

[76] Inventor: Bruno J. Zapart, 3624 N. Janssen St., Chicago, Ill. 60613

[21] Appl. No.: 886,481

[22] Filed: Mar. 14, 1978

[51] Int. Cl.² .............................................. B23Q 3/00
[52] U.S. Cl. ...................................... 269/9; 409/219; 269/82; 269/88; 269/287; 269/309; 269/246; 269/321 N
[58] Field of Search ........................ 269/9, 82, 88, 287, 269/309, 246, 321 N; 90/DIG. 18; 408/104; 51/220; 33/174 R

[56] References Cited

U.S. PATENT DOCUMENTS

| | | | |
|---|---|---|---|
| 1,994,422 | 3/1935 | Sasek | 269/309 |
| 2,455,024 | 11/1948 | Schneider | 269/321 N |
| 2,585,594 | 2/1952 | Snyder | 269/246 |
| 2,676,413 | 4/1954 | Wharton et al. | 269/321 N |
| 4,070,012 | 1/1978 | La Rocco | 269/321 N |

*Primary Examiner*—Robert C. Watson
*Attorney, Agent, or Firm*—Ralph R. Pittman

[57] ABSTRACT

A V-block fixture for holding a workpiece during a shaping operation has a frame holder and a complementary frame associated with the holder. The frame has a V-block rigidly secured thereto, and the frame and V-block as a unit may be quickly and easily removably secured to the holder in any one of a large number of differing preselected configurations.

13 Claims, 9 Drawing Figures

SELECTIVELY POSITIONAL V-BLOCK FIXTURE

BACKGROUND OF THE INVENTION

The art of toolmaking requires precision shaping of workpieces, particularly in grinding operations, and a convenient and widely used holder for the workpieces is some sort of a V-block against which the workpieces are clamped while being ground.

Since many grinding programs make necessary several releasing and reclamping operations for repositioning the workpiece in the conventional V-block, the substantial periods of time required for such manipulations constitutes an important part of the cost of the machining operation; toolmakers are highly skilled craftsmen commanding commensurately high hourly rates of pay.

There are now available several V-block fixtures having two or more V-shaped recesses, the use of which requires repositioning the fixture by inverting it or turning it on a side. Other known fixtures embody several V-blocks differing in height, the desired elevation of the workpiece being effected by selecting the appropriate V-block or some group combination thereof.

The invention herein enables the position of a V-block with a workpiece clamped therein to be quickly and easily reset, not only to a large number of raised or lowered positions with respect to the axis of an associated indexing holder, but also through a 90° angle, moving the axis of the workpiece, for example, from a horizontal to a vertical disposition.

SUMMARY OF THE INVENTION

The V-block fixture described herein includes a generally rectangular mounting frame upon which a V-block is rigidly secured, and a frame holder into which the frame may be slip-fitted and anchored in a preselected position.

The frame holder has a shank adapted for extending into and being held by the collet of an indexing device, one end portion of the shank projecting forwardly from the collet. An outstanding peripheral flange at the forward end of the shank has a pair of forwardly projecting ledges transversely spaced in parallel relationship, between which ledges the frame carrying the V-block may be slidably slip-fitted. Set screw fasteners spaced along and extending through the ledges are disposed to engage the frame for removably securing the frame and V-block as a unit in one of a large number of preselectable positions.

The V-block mounting frame has a centrally windowed backplate and a shelf on which the V-block is mounted, the shelf projecting outwardly from the margin of one of the shorter sides of the rectangular backplate. The width of the shelf portion is identical to that of the backplate side from which it projects, resulting in conjoining coextensive L-shaped edges portions along the backplate and shelf, either of which is adapted to engage the inner faces of the ledges of the frame holder.

A lug extends outwardly from the middle of the margin along the other shorter side of the backplate and a threaded opening, axially aligned with the midpoint of the V-block, extends through the lug and a workpiece clamping screw threadedly engages the opening, the outer end of the clamping screw being movable into the V-shaped recess of the V-block.

The V-block is secured to the shelf portion by means of screw fasteners extending through oblongated counterbored holes in the shelf, for the purpose of enabling limited transverse adjustment of the V-block along the shelf.

DESCRIPTION OF THE PREFERRED EMBODIMENT

Figure 7:
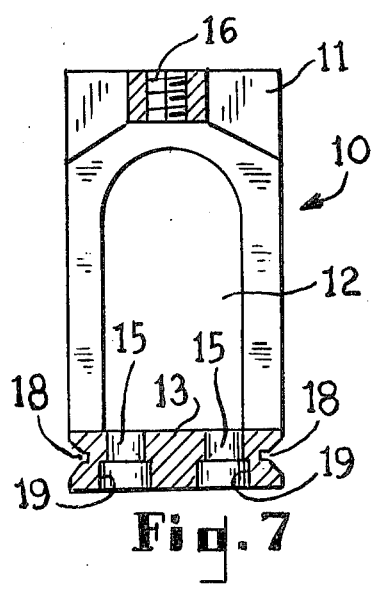
FIG. 7 is a sectional elevation taken along the line 7—7 of FIG. 6.
Figure 6:
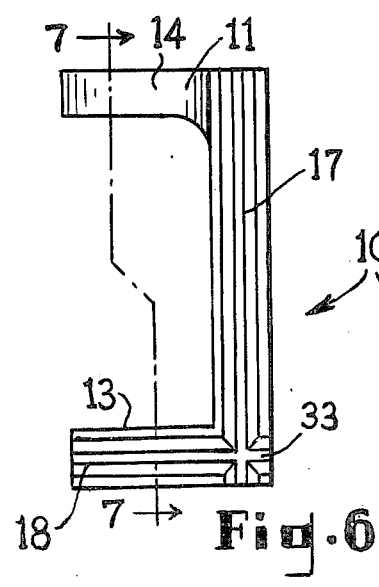
FIG. 6 is a side elevational view of the V-block mounting frame.

The invention includes two separable assemblies, fashioned for joining together to present two specific postures or configurations, the assemblies after being joined being relatively adjustable in each configuration. One of the assemblies is the frame holder 25, which is adapted for receiving the V-block mounting frame 10, details of the latter being shown in FIGS. 6, 7 and 8 of the drawing.

Referring to these figures of the drawing, the V-block mounting frame has a backplate 11, there being a central window 12 therein. The backplate 11 is generally rectangular in shape, and a shelf portion 13, of the width of the backplate, extends normally outward from the margin of one of the shorter sides of the backplate.

The V-block (FIG. 9) is provided with a transversely spaced pair of internally threaded blind holes 21 extending upwardly from the planar bottom of the V-block, and a pair of similarly spaced counterbores extend through the shelf portion 13, the smaller opening portion of the counterbores 15 (FIGS. 7 and 8) merging with the enlarged lower portion 19.

Figure 3:
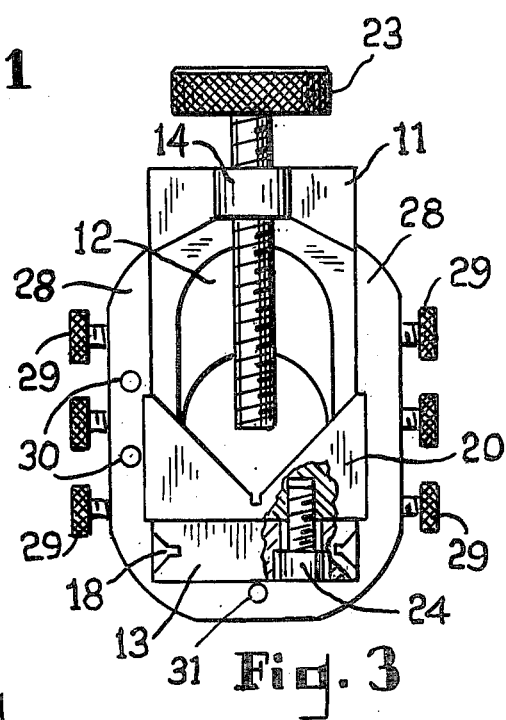
FIG. 3 is a front elevational view of the fixture, corresponding to the side elevational view at FIG. 1.
Figure 8:
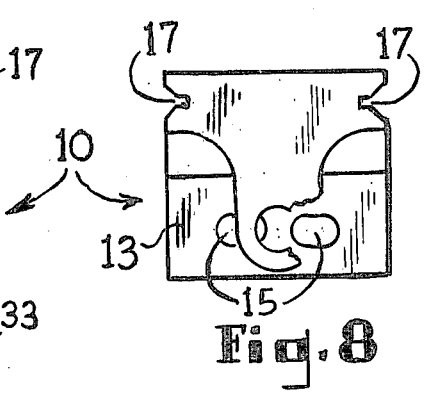
FIG. 8 is a plan view of the mounting frame, a part being broken away to show an oblongated fastener-receiving opening.
Figure 9:
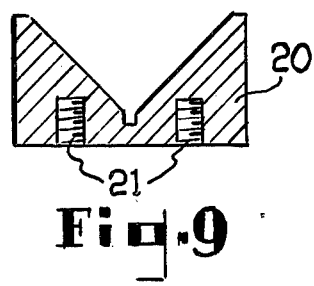
FIG. 9 is a sectional view of the V-block.

A headed threaded fastener 24 (FIG. 3) extends through each of the counterbores in threaded engagement with the internally threaded holes 21, thereby rigidly securing the V-block 20 to the shelf portion 13. As shown in FIGS. 3 and 8, the counterbores through which the fasteners 24 pass are oblongated transversely along the shelf portion 13, the counterbores being only partially filled by the fasteners 24 to enable the V-block and the associated fasteners 24 to be shifted for a limited lateral distance along the shelf portion. The V-block 20 is normally located so that the intersection of its planar sloping sides lies along a line passing normally midway through the backplate.

A lug 14 extends outwardly from the midmost portion of the margin along the other shorter side of the rectangular backplate 11, and an internally tapped opening 16 (FIG. 7) extends through the lug in axial alignment with the midpoint of the V-block 20. A workpiece clamp screw 22 is fitted in threaded engagement with the internally threaded opening 16, the outer end of the clamp screw being movable into the V-recess of the V-block 20 as the knurled head 23 of the clamping screw is rotated.

The longer lateral edges of the rectangular backplate 11 and the conjoined shelf portion 13 lie in parallel planes, and a V-groove 18 along each of the lateral edges of the shelf portion 13 is coextensive with a similar groove 17 along each of the longer lateral edges of the backplate 11, the grooves being continuous through their corner junction 33.

The V-block frame holder 25 has an elongate cylindrical rearwardly extending portion 26 the forward end of which merges with the truncated conical portion 34. The oblong peripheral flange 27 extends outwardly from the larger and forward end of the conical portion 34, and a pair of transversely spaced ledges 28 having opposed planar parallel faces project forwardly from the lateral longer margins of the oblong flange 27.

The depth and spacing of the ledges 28 so correspond respectively to the thickness and width of the conjoined shelf portion and rectangular backplate that either of the latter elements may be selectively slip-fitted between the ledges 28 and slidably moved therealong. For securing in place whichever element of the mounting frame as may be nested between the ledges 28, a plurality of set screws 29 extend inwardly in threaded engagement through each of the ledges, the set screws 29 being aligned to contact and rigidly fix the mounting frame in a preselected position in the holder.

To facilitate precision setting of the V-block, a plurality of index-pin holes 30 extend inwardly from the forward surfaces of the ledges at predetermined locations, and the position of the frame on which the V-block is mounted and therefore the setting of the V-block may be determined with reference to an inserted index pin by a micrometer or other measuring device.

The internal positions of the set screws 29 are directed to project into the groove 17 or 18 of the mounting frame 10 (FIGS. 2 and 5) so that their internal ends engage only those internal sloping sides of the vee grooves which are adjacent to the frame holder 25. Loosening of the tightened set screws 29 frees the mounting frame 10 for slidable movement along the ledges 28, the inner end portions of the set screws 29 functioning as guide elements permitting the slidable movement while restraining outward movement of the mounting frame 10 from the holder 25. Preferably the number of set screws should be such that two from each side of the holder are available to engage the frame throughout the desired range of slidable movement.

For establishing a limit setting of the V-block frame and the V-block, an index-pin hole 31 (FIG. 3) extends inwardly into the front lower central portion of the flange 27 for receiving an index pin against which the frame may be abutted.

The V-block fixture described herein enables rapid and accurate positioning of a clamped workpiece in a very large number of configurations by means of appropriate movements of the movable V-block mounting frame with respect to the associated holder.

Figure 1:
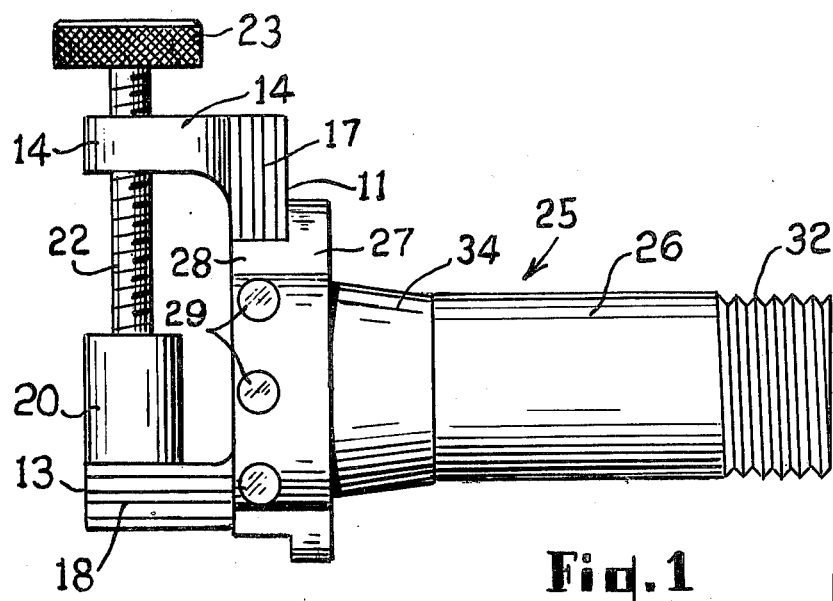
FIG. 1 is a side elevational view of the fixture, in which the V-block mounting frame is positioned for holding the V-block in a posture for receiving a horizontzlly disposed workpiece.
Figure 2:
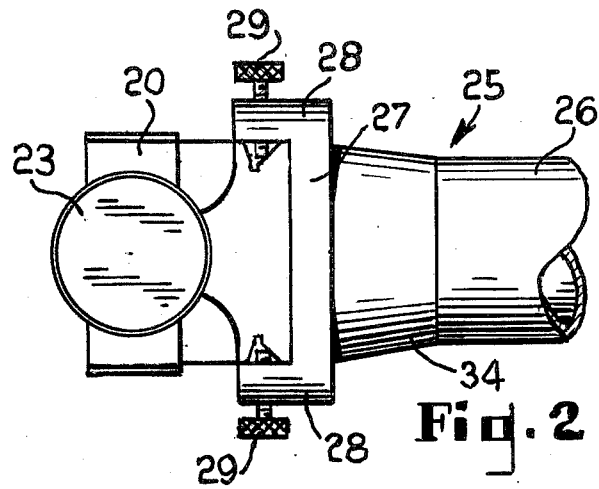
FIG. 2 is a partial plan view of forward end portion of the fixture, corresponding to the side elevational view at FIG. 1.

In the drawings, FIGS. 1, 2 and 3 illustrate the disposition of the parts when the machining operation calls for an axially directed workpiece, this arrangement being one of the two available postures of the V-block.

During the use of the fixture in this posture, the shank 26 is inserted into a collet of an indexing device, the conically tapered portion 34 centering the shank by contact with the forward end of the collet as the threaded end portion 32 of the shank is axially moved along the collet. Elongate workpieces may be extended rearwardly through the window of the backplate and into the opening of the tubular shank portion.

Figure 4:
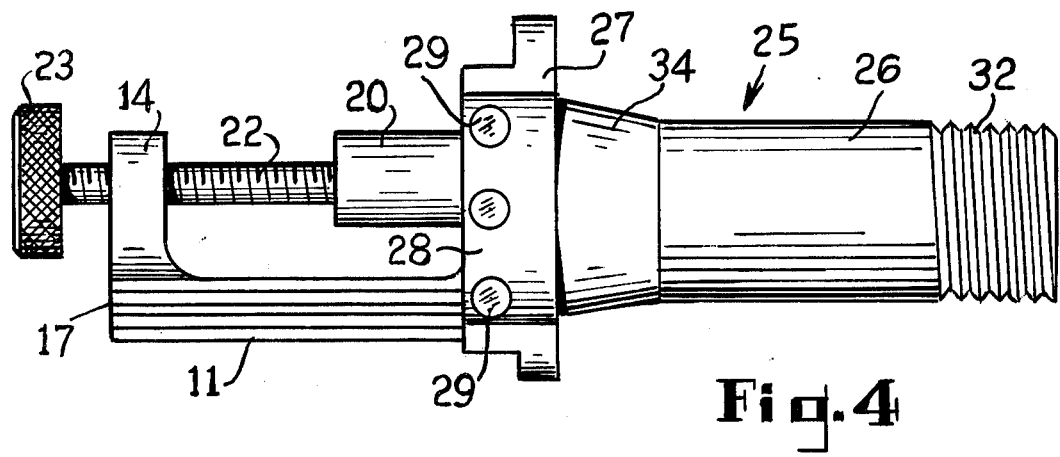
FIG. 4 is a side elevational view of the fixture, in which the V-block mounting frame is positioned for holding the V-block in a posture for receiving a vertically disposed workpiece.
Figure 5:
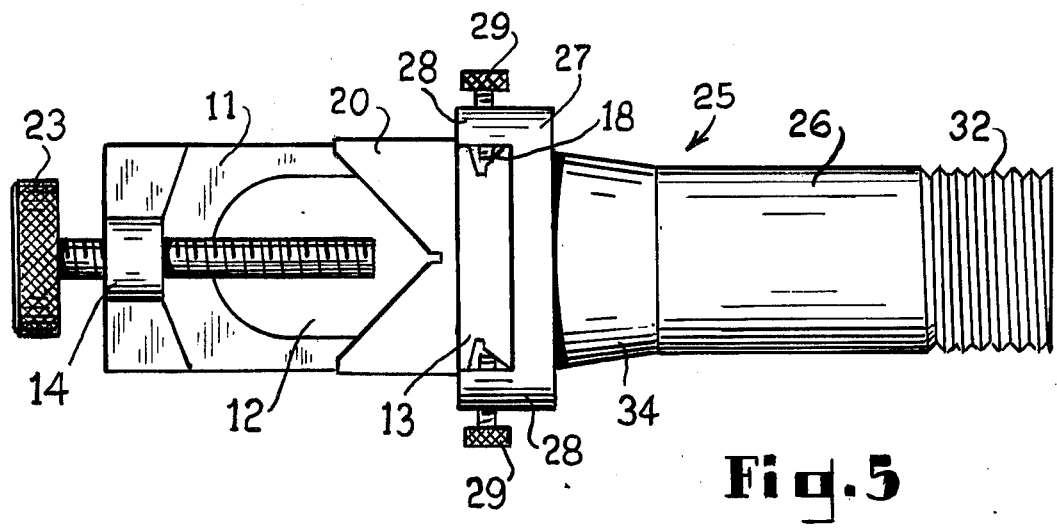
FIG. 5 is a plan view of the fixture, corresponding to the side elevational view at FIG. 4.

The other posture of the V-block, illustrated at FIGS. 4 and 5 is readily available by simply substituting the shelf portion of the mounting frame for the backplate between the ledges of the holder. This substitution rotates the V-block so that the V-block recess faces axially away from the holder shank, and is particularly useful in shaping the ends of workpieces. Elongate workpieces clamped in this posture of the V-block are limited in size only by the dimensions of the window opening of the backplate.

The considerable versatile capability of the fixture herein described is principally attributable to the provision of a frame holder on which a frame carrying a V-block may be not only easily and quickly mounted to define one of two differing V-block postures, but also a construction in which the mounting frame is rectilinearly movable with respect to the holder in either posture and fixedly securable thereto in any one of a large number of preselectable positions.

What is claimed is:
1. A V-block fixture comprising:
   a selectively positional mounting frame including a centrally windowed rectangular backplate, a shelf portion equal in width to that of a shorter side of said backplate projecting outwardly from the margin of one of the shorter sides thereof;
   a V-block secured to said shelf and extending outwardly from the top thereof, said V-block having a central V-shaped recess extending inwardly the sloping sides of which lie along planes which intersect to define a line passing midway between the longer sides of said backplate;
   a lug projecting outwardly from the midmost marginal portion of the other shorter side of said rectangular backplate, an internally screw threaded opening extending through said lug in axial alignment with the medial point of said V-block and a workpiece clamping screw threadedly engaged with said lug and movable toward said V-block;
   a frame holder including an elongate shank portion, a peripheral flange extending outwardly at the forward end of said shank, said flange having a pair of marginal forwardly projecting ledges between which said mounting frame is insertable in slidable slip fit engagement, the inner surfaces of said ledges defining opposed parallel faces transversely separated a distance equal to the common width of said backplate and said shelf; and
   fastening means for optionally removably fixing either the backplate or the shelf portion of said mounting frame in a preselected position between said ledges.
2. The V-block fixture claimed in claim 1, in which the fastening means for fixing the backplate or the shelf portion of the mounting frame in the preselected position between the marginal ledges of the flange includes at least two set screws threadedly engaged with said ledges and passing transversely therethrough to engagement with the mounting frame.

3. The V-block fixture claimed in claim 1, in which a groove extends in an L-shaped path along the entire length of the conjoining edges of said backplate and said shelf portion.

4. The V-block fixture claimed in claim 1, in which a vee groove extends in an L-shaped path along the entire length of the conjoining edges of said backplate and said shelf portion.

5. The V-block fixture claimed in claim 1, wherein a plurality of radially spaced holes extend axially into the forward face of said flange, said holes being adapted for receiving slip-fitted indexing pins.

6. The V-block fixture claimed in claim 1, wherein said shank portion is tubular in shape and the backplate is movable to axially align the window of the backplate with the opening through the shank portion.

7. The V-block fixture claimed in claim 1, in which the shank portion adjacent to said flange is shaped as a truncated cone tapering from the junction with the flange.

8. The V-block fixture claimed in claim 1, wherein said peripheral flange is oblong in outline and one of said ledges is coextensive with each of the elongated sides of the flange.

9. The V-block fixture claimed in claim 1, wherein the shelf portion of the mounting frame projects outwardly from the backplate a distance of not more than one-half of the length of the backplate.

10. The V-block fixture claimed in claim 1, wherein an adjustable securing means removably fixes said V-block to said shelf portion, said means including a headed threaded fastener extending through an unthreaded opening through said shelf portion and into threaded engagement with said V-block, said opening being only partially filled by said fastener and being in the shape of an oblongated counterbore, the flat-bottomed enlargement of the counterbore merging with the other potion of the counterbore and providing space for limited movement of the engaged fastener and associated V-block with respect to the shelf portion.

11. A V-block fixture comprising:
a mounting frame having a rectangular backplate;
a rectangular planar shelf portion joined to said backplate along the margin of one of the shorter sides of said backplate and extending perpendicularly outward therefrom;
a V-block secured to said shelf portion and extending in parallel relationship with said backplate;
a lug projecting outwardly above said V-block from the other shorter side of said backplate, an internally threaded opening extending through said lug in axial alignment with the midpoint of said V-block and an elongate workpiece clamping screw threadedly engaging said opening and movable into the V-shaped recess of said V-block;
a frame holder having a shank portion and an oblongated peripheral flange extending outwardly therefrom;
a pair of transversely spaced ledges projecting forwardly from said flange, the inner surfaces of said ledges defining planar opposed parallel faces separated by an interval to enable the disposition of said shelf portion therebetween at a preselected position and in slidable slip fit engagement therewith; and
fastening means disposed along said ledges, said fastening means being operable to removably secure said shelf portion in said preselected position.

12. A V-block fixture comprising:
a mounting frame having a rectangular backplate;
a rectangular planar shelf portion joined to said backplate along the margin of one of the shorter sides of said backplate and extending perpendicularly outward therefrom;
a V-block secured to said shelf portion and extending upwardly therefrom in spaced parallel relationship with said backplate;
a lug projecting forwardly above said V-block from the other shorter side of said backplate, an internally threaded opening extending through said lug in axial alignment with the midpoint of said V-block, and an elongate workpiece clamping screw threadedly engaging said opening and movable into the V-shaped recess of said V-block;
a frame holder having a shank portion and an oblongated peripheral flange extending outwardly from one end thereof;
a pair of transversely spaced ledges projecting forwardly from said flange, the inner surfaces of said ledges defining planar opposed parallel faces separated by the complementary interval requisite to enable the disposition of said backplate therebetween at a preselected position and in slidable slip fit engagement therewith; and
fastening means disposed along said ledges, said fastening means being operable to removably secure said backplate in said preselected position.

13. The V-block fixture claimed in claim 12, wherein a vee groove extends linearly along the longer opposed edges of said backplate and at least two set screws threadedly engage each of said ledges and pass transversely therethrough to engagement with only those internal sloping sides of said vee grooves which are adjacent to said frame holder.

* * * * *